Figure 1:
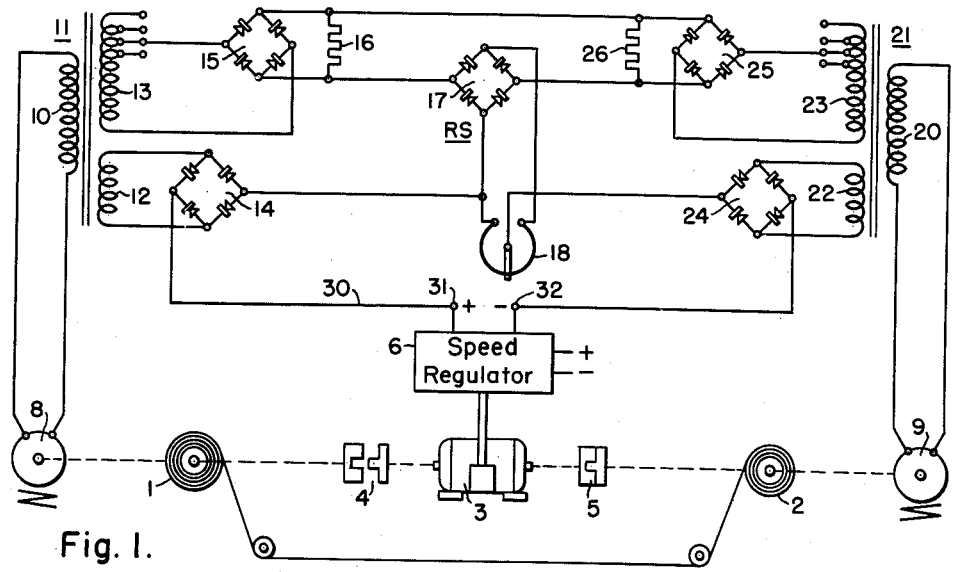

Nov. 29, 1955  T. M. GREER  2,725,507
MOTOR CONTROL DEVICE
Filed Aug. 5, 1950  2 Sheets-Sheet 1

WITNESSES:
Robert C. Baird
Wm. le Groome

INVENTOR
Thomas M. Greer.
BY C. M. Avey
ATTORNEY

Nov. 29, 1955  T. M. GREER  2,725,507
MOTOR CONTROL DEVICE
Filed Aug. 5, 1950  2 Sheets-Sheet 2

WITNESSES:
Robert C. Baird
Wm. Le Groome

INVENTOR
Thomas M. Greer.
BY C. M. Avery
ATTORNEY

United States Patent Office 2,725,507
Patented Nov. 29, 1955

2,725,507
MOTOR CONTROL DEVICE

Thomas M. Greer, Pittsburgh, Pa., assignor to Westinghouse Electric Corporation, East Pittsburgh, Pa., a corporation of Pennsylvania Application August 5, 1950, Serial No. 177,818

26 Claims. (Cl. 318—6)

My invention relates to rewinder drives which wind a web, fabric, sheet, tape or the like material from one reel and simultaneously wind it onto another reel. Such rewinders are used, for instance, in textile and other industries for the processing of material as it passes from one reel to the other. More particularly, the invention relates to electric devices, applicable with such rewinders, for providing a voltage of a desired dependency upon the pass speed of the material being wound.

During rewinding operations, the supplying reel increases its revolving speed with respect to the speed of the supplied reel so that, at any moment, both reels have substantially the same instantaneous peripheral speed which is identical with the linear travelling speed (pass speed) of the material. In some of these processes, it is detrimental or inconvenient to use a peripherally driven roll to measure the pass speed for purposes of speed indication or regulation, or to use a peripherally driving roll to dictate the pass speed. For instance, there are textile dying operations that require passing the material through a bath of dye at a desired pass speed and for which it is undesirable to have a roll or other speed measuring device in contact with the material when it is not submerged in the bath.

It is, therefore, an object of my invention to provide an intelligence voltage of a given relation to the pass speed by means of electric devices that do not require a contact engagement with the reeling material or reel periphery but produce or control the intelligence voltage in dependence upon the revolving speed of the reels.

Obviously, the pass speed is dependent upon the revolving speeds of the two reels and the relative winding diameters. For instance, if at a given ratio of diameters, both reeling speeds are doubled, the pass speed also is doubled. However, the dependency of pass speed on reeling speeds and reel diameter ratio is non-linear, and past attempts at devising translating apparatus for industrial purposes to provide an output voltage indicative of the pass speed as a function of the reeling speeds have failed or would require equipment too complicated for satisfactory industrial and economical application.

It is, therefore, a more specific object of my invention to achieve the above-outlined aim in a simple and economical manner and with results of an accuracy sufficient for satisfactory industrial application.

Still another object, in conjunction with the foregoing, of my invention is to provide an intelligence voltage which, though derived from the revolving speeds of the rewinder reels, is substantially proportional to the rewinder pass speed.

According to my invention, I provide two tachometer generators or other component source means of respective variable voltages $E_1$ and $E_2$ proportional to the revolving speeds of the two rewinder reels, and I connect these two component voltage sources with a mixer circuit to impress thereon two component voltages derived from the two speed-responsive voltages and related to each other to produce across the terminals of the mixer circuit a resultant voltage $E_t$ in accordance with the relation $$cE_t = E_1 + E_2 - k|E_1 - E_2| \quad (1)$$

wherein $c$ and $k$ are constant factors. The terminal voltage $E_t$ thus produced is available as the desired intelligence or cue voltage for control, regulating or exhibiting purposes and has a characteristic behavior relative to the pass speed depending upon the choice or adjustment of the proportionality factor $k$. The factor $c$ depends upon circuit constants and has no effect on the behavior of the terminal voltage other than its absolute value of amplitude. Hence, the factor $c$ is hereinafter neglected, i. e. assumed to be unity, it being obvious that any desired fraction or multiple of the intelligence voltage can be used without departing from the invention. Equation 1 then becomes:

$$E_t = E_1 + E_2 - k|E_1 - E_2| \quad (1a)$$

In most cases, a substantially proportional relation between pass speed and intelligence voltage is desired. Such a proportional relation is obtained if, according to another feature of the invention, the factor $k$ is made approximately equal to $$k = \frac{R + 1 - 2(1/2 + 1/2R^2)^{-1/2}}{R - 1} \quad (2)$$

wherein $R$ is the build-up ratio, i. e. the ratio $r_1/r_2$ of full reel diameter $r_1$ to empty reel diameter $r_2$.

If the factor $k$ is made appreciably larger than resulting from Equation 2, the intelligence voltage produced according to the invention increases for a given pass speed from 0% pass toward the middle of the pass and decreases thereafter toward 100% pass. On the other hand, if the factor $k$ is made appreciably smaller than resulting from the Equation 2, then the intelligence voltage for a given pass speed drops from an initial value at 0% pass toward middle pass and thereafter increases until the end of the pass. For any chosen or adjusted factor $k$, the behavior of the intelligence voltage during the pass follows a definite law determined by the value of the factor $k$. The invention thus offers a versatile adjustment of the intelligenc voltage characteristic and hence, for instance, a corresponding control of the rewinder drive regulated by the voltage, merely by a simple voltage adjustment such as is obtainable by adjustable transformers or rheostats.

According to a more specific feature of my invention, the above-mentioned mixer circuit or the appertaining connection with one or both of the component voltage sources is equipped with pole reversing means, such as polarized relay or rectifier devices, that maintain fixed output polarities in the mixer circuit regardless of a change in input polarity occurring when, during the rewinder pass, the two component source voltages ($E_1$ and $E_2$) pass through equality.

According to another feature, and in a preferred aspect of my invention, I connect the two tachometer generators or other component sources of reel-speed responsive voltages in additive or series-cumulative voltage relation to each other with the mixer circuit so that one of the component voltages impressed on the mixer circuit is proportional to the sum ($E_1+E_2$) of the reel speed voltages; and I also connect the two component sources in differential or series-opposed relation to each other with the mixer circuit so that the other component voltage impressed on the mixer circuit is proportional to the absolute value of the difference between the two reel speed voltages ($E_1-E_2$), the poling being such that the second component voltage is series-opposed to the first component voltage.

According to still another feature of my invention, I connect the output terminals of two rectifiers in series-opposed relation to each other with the mixer circuit, and I further connect the two reel-speed responsive voltage sources in additive relation to each other with the input terminals of one rectifier and in subtractive relation to each other with the input terminals of the other rectifier.

Figure 2:
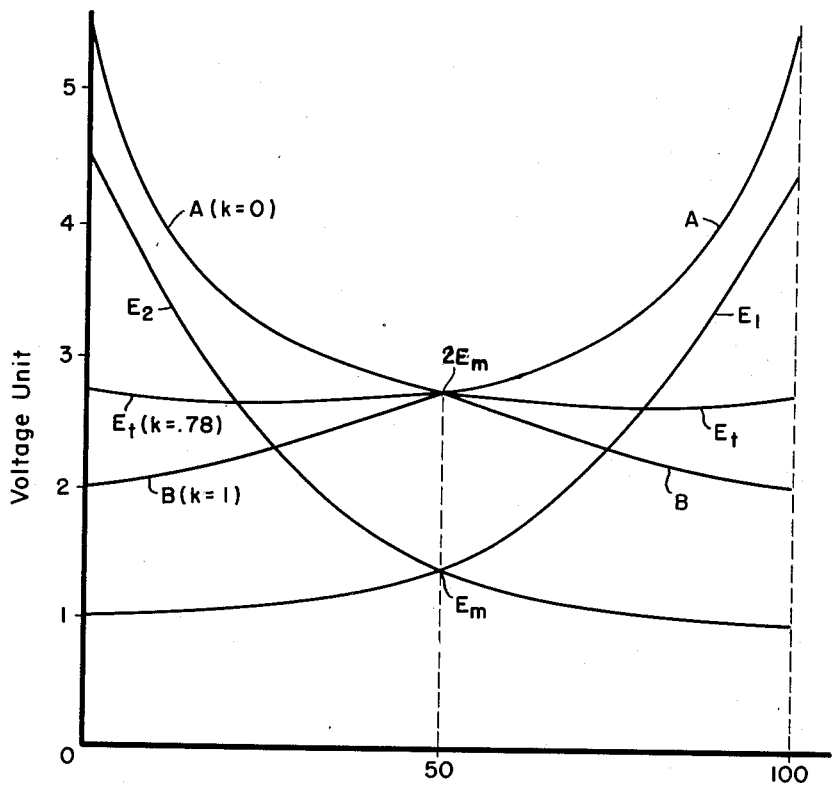
Figure 3:
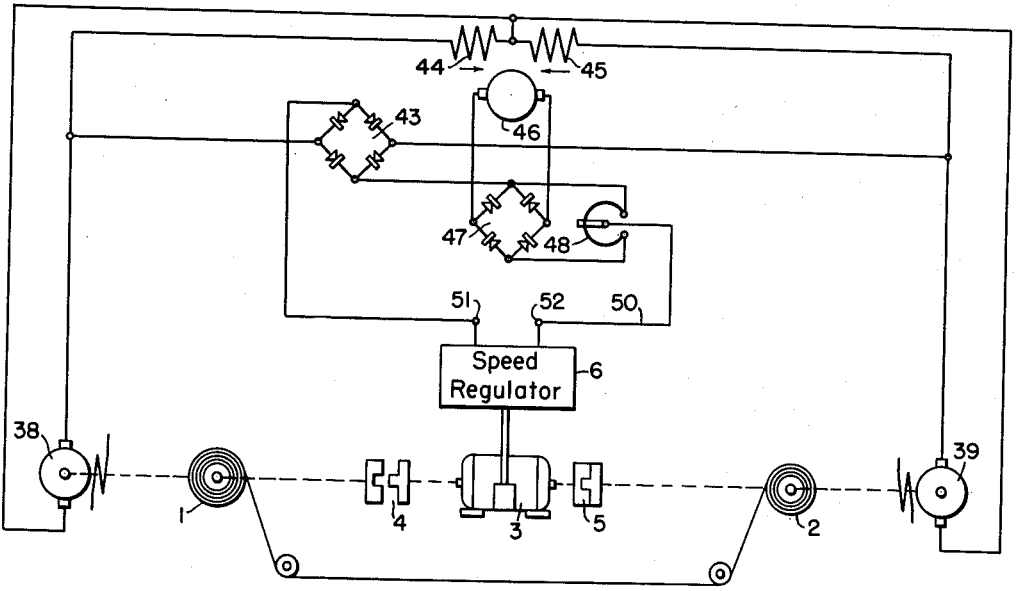
Figure 4:
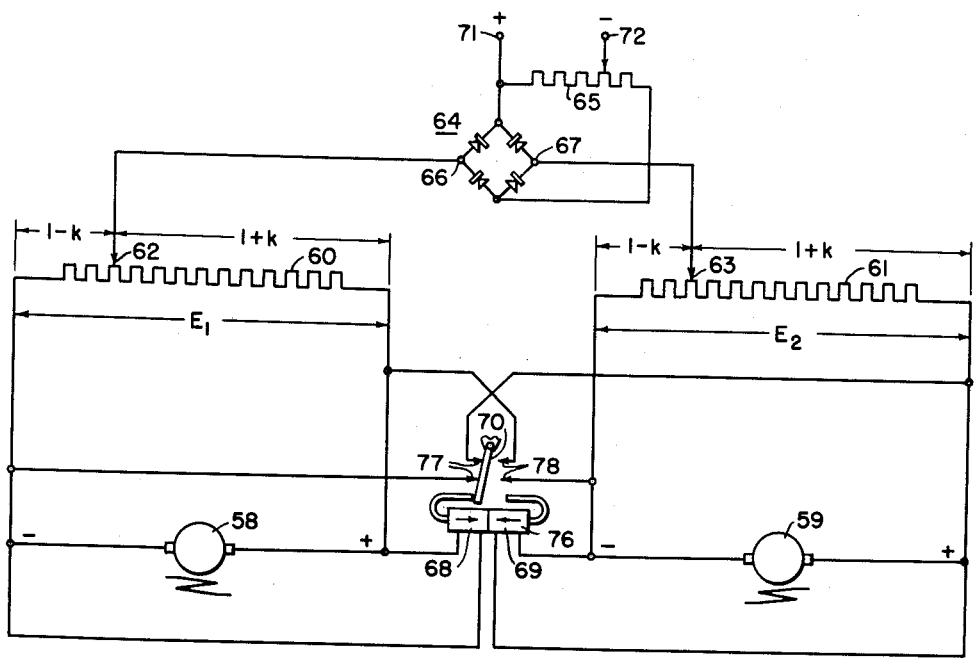

The foregoing and other objects and features of my invention will be apparent from the following description in conjunction with the drawings, in which:

Fig. 1 shows schematically a rewinder in conjunction with the circuit diagram of a composite voltage source according to the invention, Fig. 2 is a coordinate diagram explanator of the operation of the devices of Fig. 1, while Figs. 3 and 4 show schematically two other embodiments, respectively, of composite voltage sources according to the invention.

The illustration in Fig. 1 includes a schematic representation of a rewinder drive to be used, for instance, in connection with a textile dye vat. The material passes from a reel 1 along suitable guiding means, such as the illustrated auxiliary guide rolls, to a reel 2 or vice versa. The particular manner in which the two beams or cores of the reel are driven is not essential to the present invention. There are drives in which each reel is connected with its own drive motor, both motors being speed controlled in proper relation to each other. In other known drives a single motor is provided which is selectively coupled with the one reel that is to take up the material at a time, the other reel being then unwound by the pulling force of the material. For the sake of simplicity a drive of the latter type is shown in Fig. 1. It comprises a motor 3 with two couplings 4 and 5. The coupling 5 is shown to be closed so that the reel 2 is driven in the take up direction while the material is being unwound from the reel 1. After the completion of a pass the coupling 5 is opened and the coupling 4 closed so that then the reel 1 is driven in the reverse direction to take up the material then being unwound from reel 2. The motor 3 is connected to a speed regulator 6. Various types of such speed regulators for the control of one or two reel motors are applicable. Their operation involves a comparison between a variable intelligence or cue voltage with a constant pattern voltage, or other reference, adjusted in accordance with the desired speed or other characteristic of the drive. The speed regulator controls the motor so that its speed has the value needed to substantially balance the constant pattern voltage against the variable intelligence voltage. Suitable electronic regulators as well as electromagnetic and ward-Leonard type control and regulating systems are available and too well known to require further description.

In the rewinder system according to Fig. 1, the just-mentioned intelligence voltage is provided by a composite source of intelligence voltage which comprises two alternating-current tachometer generators 8 and 9 connected with the cores of the respective reels 1 and 2 so that the output voltage of each generator is proportional to the revolving speed of the appertaining one reel. Connected to the generator 8 is the primary 10 of a transformer 11 with two secondaries 12 and 13. Secondary 12 is connected to the input terminals of a full wave rectifier 14 whose output terminals provide a unidirectional voltage proportional to the speed-responsive voltage of generator 8. The secondary 13 is connected to the input terminals of a rectifier 15 whose output terminals are bridged by a load resistor 16 and connected in series with the input of another rectifier 17. An adjustable load resistor 18 lies across the output terminals of rectifier 17.

The generator 9 is connected to the primary 20 of a transformer 21 with two secondaries 22 and 23. A rectifier 24, connected to the secondary 22, provides at its output terminals a unidirectional voltage proportional to the speed-responsive voltage of generator 9. The secondary 23 is connected to a rectifier 25 whose output terminals are bridged by a load resistor 26 and series-connected with the input of the above-mentioned rectifier 17.

The rectifiers 14, 17 and 24 have their respective output terminals connected in a mixer circuit 30 across whose terminals 31 and 32 the desired unidirectional terminal voltage is to appear. The two rectifiers 14 and 24 are poled in cumulative relation to each other. Consequently, they represent together a circuit member which provides a first component voltage proportional to the sum of the two variable voltages from generators 8 and 9. The two rectifiers 15 and 25 in the input circuit of rectifier 17 are poled in series-opposed relation to each other so that the input terminals of rectifier 17 are impressed by a voltage proportional to the difference of the two variable voltages from generators 8 and 9. Consequently, the rectifier 17 impresses on the mixer circuit 30 a second component voltage proportional to the just-mentioned voltage difference. Rectifier 17 in mixer circuit 30 is poled in opposition to rectifiers 14 and 24. The resultant intelligence voltage impressed across the terminals 31 and 32 and applied to the speed regulator 6 is proportional to the sum of the two generator voltages minus a proportion of the absolute difference between the two generator voltages as required by the above-mentioned Equation 1. The secondaries 13 and 23 are equipped with selective taps, and the load resistor 18 consists of a rheostat with an adjustable tap in order to properly select or vary the just-mentioned proportion in accordance with the desired value of the factor $k$ in the Equation 1. The resistor 18 as well as the resistors 16 and 26 also serve to draw sufficient current from the respective rectifiers so that the flow of current in the rectifier bridges has always the desired direction. Instead of providing taps for secondaries 13 and 23, or in addition to mid taps, the resistors 16 and 26 may be designed as rheostats for adjusting the factor $k$.

Two-winding transformers may be used instead of three-winding transformers if tachometer isolation is not important.

As mentioned previously, a device according to the invention, such as exemplified in Fig. 1, can be set to deliver an intelligence voltage which is either substantially proportional to the pass speed of the material or is otherwise related to the pass speed in a desired manner depending upon the adjustment of the above-mentioned voltage proportion dependent upon the selected tap points of secondaries 13 and 23 or upon the selected adjustment of the rheostat 18, or upon both means of adjustment.

In order to explain the operation of the apparatus and for determining a suitable or preferable value for the proportionality factor $k$, let us first consider the most frequently desired case of approximate proportionality between desired intelligence voltage and pass speed.

The factor $k$ depends upon the reel build-up ratio during a complete pass. One way of determining a value of $k$ sufficiently accurate for many applications is as follows: Assume that $k$ is correct, when the result is $$E_t(P=0, k) = E_t(P=.5, k)$$

where $E_t$ is a function of $P$ and $k$, $P$ being the portion of the pass completed, i. e. it is necessary to find the speeds $N_1$ and $N_2$ of the two reel cores in terms of the pass speed $(S)$, the portion of pass completed $(P)$, the build-up ratio $(R)$ and the maximum diameter $(D_{max})$: That is $N_1$ will be equal to a function of the pass speed $S$, the portion $P$ of the pass of this reel completed and the build-up ratio $R$ and the maximum diameter $D_{max}$ and $N_2$ is similarly equal to a function of this quantities.

$$N_1 = f(S, P, R, D_{max})$$
$$N_2 = g(S, P, R, D_{max})$$

There are two fundamental relationships:

$$N_1 \pi D_1 = N_2 \pi D_2 = S \quad (3)$$

i. e. the reel surface speeds equal each other at all times; and $$D_1^2 + D_2^2 = k_1^2 \quad (4)$$

i. e. the sum of the reel end areas remains constant at all times. By definition, the reel build-up ratio (R) is expressed as:

$$R = \frac{D_{max}}{D_{min}}$$

At the start $$D_1 = D_{max}$$
$$D_2 = D_{min}$$

Therefore:

$$k_1^2 = D^2_{max} + D^2_{min}$$
$$D_{min} = \frac{D_{max}}{R}$$

hence:

$$k_1^2 = D_{max}^2 + \frac{D^2_{max}}{R^2} = D^2_{max}(1 + 1/R^2)$$

For ease of expression, transform to a new variable $\theta$, defined by $$D_1 = k_1 \cos \theta \quad (5)$$
$$D_2 = k_1 \sin \theta \quad (6)$$

It follows from Equations 3 and 5, 6 that:

$$N_1 = \frac{S}{\pi k_1 \cos \theta} \quad (7)$$

$$N_2 = \frac{S}{\pi k_1 \sin \theta} \quad (8)$$

Since P is the portion of pass completed per unit, P equals the loss of the end area on reel 1 (or the gain of end area on reel 2) divided by the total change of the area that will have occurred when the pass is complete. (i. e. when $P=1$)

$$P = \frac{D^2_{max} - D_1^2}{D_{max}^2 - D^2_{min}} = \frac{D_2^2 - D^2_{min}}{D_{max}^2 - D^2_{min}}$$

It follows from Equations 5 and 6 and the definition of R that:

$$P = \frac{D^2_{max} - k_1^2 \cos^2 \theta}{D_{max}^2 - \frac{D^2_{max}}{R^2}}$$

$$= \frac{D^2_{max} - D^2_{max}(1 + 1/R^2) \cos^2 \theta}{D_{max}^2 - \frac{D^2_{max}}{R^2}}$$

$$= \frac{1 - (1 + 1/R^2) \cos^2 \theta}{1 - \frac{1}{R^2}}$$

Hence:

$$\cos^2 \theta = \frac{-(1-1/R^2)P + 1}{1 + 1/R^2}$$

and $$\cos \theta = \sqrt{\frac{1-(1-1/R^2)P}{1+1/R^2}} \quad (9)$$

Substitute $\cos \theta$ from Equation 9 into Equation 7 to obtain:

$$N = \frac{S}{\pi D_{max} 1 - \sqrt{(1-1/R^2)P}} \quad (10)$$

$$P = \frac{(1+1/R^2) \sin^2 \theta - 1/R^2}{1 - 1/R^2} \quad (11)$$

$$\sin \theta = \sqrt{\frac{P(1-1/R^2) + 1/R^2}{1 + 1/R^2}} \quad (12)$$

Substitute $\sin \theta$ from Equation 8 into Equation 6 to obtain:

$$N_2 = \frac{S}{\pi D_{max} \sqrt{P(1-1/R^2) + 1/R^2}} \quad (13)$$

Assume a generator factor of $k_2$:

$$E_1 = k_2 N_1 = \frac{k_3}{\sqrt{1-(1-1/R^2)P}} \quad (14)$$

where $$k_3 = \frac{k_2 S}{\pi D_{max}}$$

then:

$$E_2 = \frac{k_3}{\sqrt{1/R^2 + (1-1/R^2)P}} \quad (15)$$

For values of P between 0 and 50% pass $(0 < P < .5)$, $E_1$ is larger than $E_2$. Under these conditions, Equation 1a can be written as:

$$E_t = E_1(1+k) + E_2(1-k) \quad \begin{array}{l} P=.5 \\ P=0 \end{array} \quad (16)$$

Substitute (14) and (15) into (16) to obtain:

$$E_t = \frac{k_3(1+k)}{\sqrt{1-(1-1/R^2)P}} + \frac{k_3(1-k)}{\sqrt{1/R^2 + (1-1/R^2)P}} \quad (17)$$

As previously assumed:

$$E_t(P=0; k) = E_t(P=.5\ k; k)$$

where $E_t$ is a function of P and $k$, with all other factors remaining unchanged. It follows from (17) that $$E_t(0, k) = \frac{k_3(1+k)}{\sqrt{1}} + \frac{k_3(1-k)}{\sqrt{1/R^2}} =$$

$$E_t(.5, k) \frac{k_3(1+k)}{\sqrt{1-.5(1-1/R^2)}} +$$

$$\frac{k_3(1-k)}{\sqrt{1/R^2 + .5(1-1/R^2)}} = \frac{2k_3}{\sqrt{1/R^2 + .5(1-1/R^2)}}$$

It follows:

$$1 + k = R(1-k) = \frac{2}{\sqrt{1/R^2 + .5(1-1/R^2)}}$$

$$k(1-R) + 1 + R = \frac{2}{\sqrt{1/R^2 + .5(1-1/R^2)}} = \frac{2}{\sqrt{1/2 + 1/2R^2}}$$

and $$k = \frac{\frac{2}{\sqrt{1/2+1/2R^2}} - 1 - R}{1-R} = \frac{R + 1 + \frac{2}{\sqrt{1/2+1/2R^2}}}{R-1}$$

or as stated in Equation 2;

$$k = \frac{R + 1 - 2(1/2 + 1/2R^2)^{-1/2}}{R-1}$$

With the above derived method of determining a suitable value for factor $k$, the intelligence voltage has identical values at 0%, 50% and 100% pass but departs from this value at intermediate points. However, the departures from the mean remain within limits satisfactory for many applications.

It should be understood that for a satisfactory manufacture, installation and operation of apparatus according to the invention the value of the factor $k$ is not critical. That is, when manufacturing and installing apparatus according to the invention, it is only necessary to know the approximate value or order of magnitude of the factor $k$ and to dimension the circuit components accordingly. Then the final selection or adjustment of the factor $k$ can be made after installing the apparatus and performing some trial runs of the rewinder drive. The necessary adjustment then consists only in the selection of transformer tap points or the proper positioning of the slider in one or several rheostats. Such a calibration is desirable also in order to compensate for inaccuracies or unbalance in mechanical parts or circuit components.

Satisfactory results are obtained not only at the build-up ratio for which the rewinder is designed but also when operating with a smaller ratio, for instance, when the reels are only partly filled at the end or beginning of the pass. However, the just-mentioned rheostat or transformer means can readily be readjusted for any build-up ratio smaller than that for which the rewinder is designed and may be calibrated in terms of ratio or amount of material to be wound.

The operation of the apparatus will be more fully understood from a study of the speed-pass characteristics shown in the Fig. 2. The curves $E_1$ and $E_2$ in Fig. 2 represents the tachometer voltages versus percent of completed pass for a constant speed pass. It is assumed that both reels have equal diameters when empty and equal diameters when full. The voltages are indicated in units, the voltage proportional to the lowest reel revolving speed at full reel being taken as unity. Consequently, the maximum value of each voltage occurring at empty reel is equal to the ratio R of full reel diameter to empty reel diameter. The diagram of Fig. 2 is shown for a build-up ratio of $R = 4.5$.

Under the above-mentioned conditions, but regardless of the build-up ratio, the two voltages $E_1$ and $E_2$ are equal at 50% pass. The voltage value then obtained is indicated by the intersection point $E_m$. The curve $E_t$ in Fig. 2 represents, or is proportional to, the intelligence or terminal voltage across the terminals of the mixer circuit and corresponds to the Equation 1a for a value of $k = 0.78$. The behavior of curve $E_t$ in dependence upon the value of factor $k$ can be recognized from the following considerations.

Assume that in the Equation 1a the value of $k$ is set equal to zero. Then the voltage $E_t$ is equal to the sum of $E_1 + E_2$. This sum voltage is represented in Fig. 2 by the curve A.

Now assume that in the Equation 1a the value of $k$ is equal to 1. Then the voltage $E_t$ becomes equal to twice the voltage $E_1$ in the first half of the pass and equal to twice $E_2$ in the second half of the pass. The intelligence voltage then obtained across the mixer circuit is represented in Fig. 2 by the curve B.

It will now be recognized that the intelligence voltage $E_t$ of substantially proportional relation to the pass speed lies between the intelligence voltages A (for $k=0$) and B (for $k=1$). It will also be apparent then when the factor $k$ is chosen in accordance with Equation 2 to make the intelligence voltage at 50% pass equal the voltage at 0 and 100% pass, the maximum departure of $E_t$ from the mean value is very nearly minimized with respect to varying the factor $k$. This maximum departure, divided by the mean value and multiplied by 100 gives the percent departure. It is seen that the above method of determining $k$ leads to a nearly minimized percent difference, which is favorable where proportionality between intelligence voltage and pass speed is desired.

While in the foregoing main reference was made to obtaining approximate proportionality between intelligence voltage and pass speed, the diagram of Fig. 2 also reveals that the same apparatus lends itself to obtaining different voltage characteristics simply by a change in adjustment of factor $k$. For instance, if the factor $k$ is made appreciably larger than resulting from the Equations 7 or 8, then the intelligence voltage will assume a characteristic similar to that of curve B. That is, the ratio of intelligence voltage to pass speed will increase from 0% pass to 50% pass and decrease from 50% pass to 100% pass. On the other hand, if the factor $k$ is adjusted for a value appreciably smaller than resulting from the Equation 2 then the characteristic of the intelligence voltage will be similar to curve A, that is, this voltage will drop in proportion to the pass speed as the pass proceeds from 0% to 50% and then will again increase between 50% and 100% pass. In the latter case, a rewinder drive controlled by a composite voltage source according to the invention operates at minimum speed when the pass begins, gradually increases its speed until 50% pass is reached, and thereafter decreases the speed back to the minimum speed which occurs again at 100% pass. Such a speed control is useful, for instance, for idle rewinding operations where high speed operations yet a gradual acceleration and deceleration near the beginning and end of the pass are desired.

The invention permits a larger variety of highly diversified circuit designs and modifications without departure from the features and principles explained in the foregoing. This will be recognized from the example described in the following with reference to Figures 3 and 4.

The rewinder drive shown in Fig. 3 is schematically represented in the same manner as the one shown in Fig. 1 and denoted by reference numerals 1 through 6. The composite voltage source according to the invention, as shown in Fig. 3, comprises two direct current tachometer generators 38 and 39 for connection to the shafts of reels 1 and 2, respectively. A rectifier 43 is connected across both generators and impressed by the sum of the two generator voltages $(E_1 + E_2)$. To attain this cumulative effect the polarity of tachometer D. C. generators 38, 39 corresponds to that of D. C. tachometer generators 58, 59 of Fig. 4, that is, the upper brush of generator 38 has a positive $(+)$ polarity and the upper brush of generator 39 a negative $(-)$ polarity. An auxiliary direct current generator 46 operating at constant speed has two field windings 44 and 45 connected across the respective generators 38 and 39 so that the voltage generated by generator 46 and impressed across another rectifier 47 is proportional to the difference $(E_1 - E_2)$ of the two voltages from generators 38 and 39, respectively. A rheostat 48 lies across the output terminals of rectifier 47 and is connected in series with rectifier 43 in a mixer circuit 50 whose terminals 51 and 52 supply the speed regulator 6 of the reel drive with intelligence voltage. The rectifier 47 is poled in opposition to rectifier 43. Consequently, the voltage across terminals 51 and 52 is proportional to the sum of the two tachometer voltages appearing across rectifier 43 minus a proportion of the difference between the two tachometer voltages, this proportion being taken from across part of the rheostat 48 and adjusted in accordance with the desired proportionality factor $k$ as explained previously.

It will be recognized that a polarity reversal occurs in both above-described embodiments. Referring first to Fig. 3, it is apparent that the generator 46 changes the polarity of its output voltage at the moment when the voltages from both tachometer generators become equal. However, due to the rectifier 47, the output voltage of generator 46 is reversed relative to its effect on the mixer circuit 50 so that the component difference voltage impressed on the mixer circuit is always proportional to the absolute value of the difference between the two tachometer voltages. The same polarity reversing effect occurs in the input circuit of the rectifier 17 of the embodiment shown in Fig. 1. It will be understood, therefore, that, if desired, the rectifiers can be replaced by relay means preferably of the polarized type which reverses a circuit connection in response to the polarity reversal of the difference between the two reel speed measuring voltages. In the embodiment according to Fig. 4 such a polarized reversing relay is taken advantage of for simplifying the circuit connections.

The embodiment according to Fig. 4 will best be understood if one considers that the Equation 1a can be written as two equations:

$$E_t = E_1(1-k) + E_2(1+k) \text{ for } E_1 > E_2 \quad (18)$$

$$E_t = E_1(1+k) + E_2(1-k) \text{ for } E_1 > E_2 \quad (19)$$

Consequently, under conditions where both reel diameters and both reel speeds are equal at 50% pass, a circuit arrangement which satisfies the Equation 18 during the first half of the pass, and a switching device responsive to the difference $(E_1-E_2)$ between the tachometer voltages which at 50% pass adjusts the circuit for Equation 19, will also satisfy the requirements previously set forth in this specification.

Turning now to Fig. 4 it is to be understood that the two direct-current tachometer generators 58 and 59 are to be connected with the respective reels of a rewinder in order to provide output voltages ($E_1$ and $E_2$) proportional to the respective reel speeds. A rheostat 60 is connected across generator 58 and another rheostat 61 across generator 59. The two rheostats have respective taps 62 and 63 so located that they divide each rheostat in the proportion of $(1-k)$ to $(1+k)$. A rectifier 64 has its input terminals 66 and 67 connected to the respective taps and is loaded by a resistor 65 to which the output terminals 71 and 72 of the mixer circuit are attached. A polarized relay 76 has two differentially related control coils 68 and 69 connected across generators 58 and 59, respectively. The contact member 70 has the illustrated position when the voltage $E_1$ of generator 58 is larger than the voltage $E_2$ of generator 59 and then interconnects the two contacts 77. When the voltage $E_2$ of generator 59 becomes larger than the voltage $E_1$ of generator 58, the contact member 70 switches into engagement with contacts 78.

In the illustrated relay position, which obtains during the operating range of 0% to 50% pass in Fig. 2, a circuit can be traced from terminal 66 through tap 62 and the smaller $(1-k)$ portion of rheostat 60 to contacts 77, thence through the larger $(1+k)$ portion of rheostat 61 to terminal 67. Consequently, the terminals 71 and 72 are now impressed by a small proportion of voltage $E_1$ from generator 58 plus a large proportion of voltage $E_2$ from generator 59 in accordance with the Equation 18.

At 50% pass, voltage $E_2$ becomes larger than voltage $E_1$ so that member 70 of relay 66 switches to its other position. Then a circuit can be traced from terminal 66 and tap 62 through the larger portion of rheostat 60 and through contacts 78 and the smaller portion of rheostat 61 to terminal 67. Then the intelligence voltage across terminals 71 and 72 is equal to a major portion of voltage $E_1$ plus a minor portion of voltage $E_2$ in accordance with the Equation 19. The operation of relay 76 is not critical and no especially high sensitivity is required because the apparatus when used is self-stabilizing. This is due to the fact that when relay 76 opens one set of contacts, the intelligence voltage will temporarily drop to zero, thus causing the reel drive to accelerate, with the effect that the tachometer voltage relation becomes such as to enforce a rapid reversal of the polarized relay.

It will be apparent to those skilled in the art that the invention permits of various modifications and alterations and can be embodied in apparatus other than those specifically shown and described, without departing from the gist of the invention.

I claim as my invention:

1. A composite voltage source for providing intelligence voltage dependent upon a desired pass speed in two-reel rewinders, comprising two component sources of variable voltages $E_1$ and $E_2$ proportional to the respective reel revolving speeds, a mixer circuit having output terminals and having circuit members series connected with each other between said terminals, said circuit members being connected with said component sources and comprising voltage proportioning means for impressing on said circuit two component voltages derived from said variable voltages and proportioned to provide between said terminals an output voltage substantially proportional to the value of $$E_1 + E_2 - k|E_1 - E_2|$$

wherein $k$ is a constant proportioning factor.

2. A composite source of intelligence voltages approximately proportional to the pass speed in two-reel rewinders, comprising two component sources of variable voltages $E_1$ and $E_2$ proportional to the respective reel revolving speeds, a mixer circuit having output terminals and having circuit members series-connected with each other between said terminals, said circuit members being connected with said component sources for impressing on said circuit two component voltages derived from said variable voltages to provide across said terminals a resultant voltage, said circuit members comprising voltage proportioning means adapted in accordance with a constant proportioning factor $k$ selected to have said resultant voltage substantially proportional to the value of $$E_1 + E_2 - k|E_1 - E_2|_1$$

said factor being in the neighborhood of the value of $$k = \frac{R + 1 - 2(1/2 + 1/2R^2)^{-\frac{1}{2}}}{R - 1}$$

wherein R is the ratio of full-reel to empty-reel diameters.

3. A composite voltage source for providing intelligence voltage in accordance with a desired pass speed in two-reel rewinders, comprising two component source means of variable voltages proportional to the respective reel revolving speeds, a circuit having terminals to provide therebetween the desired intelligence voltage, said two source means being connected with said circuit in series-cumulative relation to each other to impress on said circuit a first component voltage proportional to the sum of said two variable voltages, circuit means series connected in said circuit, said two source means being connected to said circuit means in series-opposed voltage relation to each other to impress on said circuit a second component voltage smaller than said first component voltage and proportional to the difference of said two variable voltages, and said circuit means being poled in said circuit to have said second component voltage oppose said first component voltage to provide said intelligence voltage as the resultant of said two component voltages.

4. A composite voltage source for providing intelligence voltage in accordance with a desired pass speed in two-reel rewinders, comprising two tachometer generators for providing respective generator voltages proportional to the respective reel revolving speeds, a circuit having terminals for providing therebetween the desired intelligence voltage, first circuit means connecting said two generators with said circuit in additive voltage relation to each other to impress on said circuit a first component voltage proportional to the sum of said two generator voltages, second circuit means connecting said two generators with said circuit in subtractive voltage relation to each other to impress on said circuit a second component voltage proportional to the difference of said two generator voltages so that said intelligence voltage is the resultant of said two component voltages.

5. Two component source means of electrical energy for producing variable voltages respectively proportional to the speeds of two revolving reels, a circuit having terminals to provide therebetween the desired intelligence voltage, said two source means being connected with said circuit in series-cumulative relation to each other to impress on said circuit a first component voltage proportional to the sum of said two variable voltages, and an electric circuit having terminals to provide therebetween the desired intelligence voltage and having circuit members connected in series relation to each other between said terminals, said members being connected with said component sources to impress said circuit with component voltages dependent upon said variable voltages so that said intelligence voltage is the algebraic sum of said component voltages, and polarity reversing means responsive to polarity reversal of the difference between said variable voltages and forming part of said circuit between said terminals to maintain said terminals at fixed respective polarities.

6. A composite source for providing intelligence voltages in accordance with a desired pass speed in two-reel rewinders, comprising two component source means of variable voltages proportional to the respective reel revolving speeds, a circuit having terminals to provide therebetween the desired intelligence voltage, said two source means being connected with said circuit in series-cumulative relation to each other to impress on said circuit a first component voltage proportional to the sum of said two variable voltages, rectifier means secondarily series connected in said circuit in opposed voltage relation to said first component voltage and primarily connected to said two source means, said two source means being series opposed to each other relative to said rectifier means to impress through said rectifier means on said circuit a second component voltage proportional to the difference of said two variable voltages.

7. A composite voltage source for providing intelligence voltage substantially proportional to the linear travelling speed of material in two-reel rewinders, comprising two reel tachometer generators for providing two variable voltages proportional to the respective reel revolving speeds, a mixer circuit having terminals to provide therebetween the desired intelligence voltage, said two generators being connected to said circuit in series-cumulative voltage relation to each other for impressing on said circuit a first component voltage proportional—in accordance with a first proportioning factor—to the sum of said two variable voltages, rectifier means, said two generators being connected to said rectifier means in series opposed voltage relation to each other and said rectifier means being connected in said circuit in series opposed voltage relation to said first component voltage to impress on said circuit a second component voltage proportional—in accordance with a second proportionality factor—to the absolute difference of said two variable voltages, said first and second proportionality factors having a ratio of $1k$, wherein $k$ is smaller than unity and approximates the value of $$k = \frac{R+1-2(1/2+1/2R^2)^{-1/2}}{R-1}$$

R being said build-up ratio.

8. A composite voltage source for providing intelligence voltage in accordance with a desired pass speed in two-reel rewinders, comprising two alternating current tachometer generators of variable voltages proportional to the respective reel revolving speeds, two transformers having respective primaries connected with said generators and having each two secondaries, a direct-current mixer circuit, three rectifiers secondarily connected in said circuit in series relation to one another, one of said rectifiers being poled in opposition to the two others, said one rectifier being primarily connected to respective two secondaries of said two transformers, said secondaries being poled in mutual voltage opposition to impress through said one rectifier on said circuit a component voltage proportional to the absolute difference of said generator voltages and said two other rectifiers being primarily connected to said remaining two secondaries to impress on said circuit another component voltage proportional to the sum of said generator voltages.

9. A composite voltage source according to claim 8, comprising voltage adjusting means disposed between said circuit and said respective transformer primaries for adjusting the ratio of said two component voltages.

10. A composite voltage source according to claim 8, one of said secondaries of each of said transformers having selective taps for adjusting the ratio of said two component voltages.

11. A composite voltage source according to claim 8, comprising a voltage dividing rheostat connected across said one rectifier and having a tap for adjusting the ratio of said two component voltages.

12. A composite voltage source for providing intelligence voltage of a desired relation to the pass speed of two-reel rewinders, comprising two tachometric sources of variable voltages proportional to the respective reel revolving speeds, a mixer circuit having terminals to provide therebetween the desired intelligence voltage, a first circuit member series disposed in said mixer circuit, said two sources being connected in series cumulative relation to each other across said first circuit member, an electromagnetic translating device having two mutually differential input circuits connected across said respective sources and having an output circuit to provide a voltage proportional to the difference of said variable voltage, a second circuit member series connected with said first member in said mixer circuit, said output circuit being connected across said second member, and said second member being poled in voltage opposition to said first member in said mixer circuit.

13. A composite voltage source for providing intelligence voltage of a desired relation to the pass speed of two-reel rewinders, comprising two tachometric sources of variable voltages proportional to the respective reel revolving speeds, a mixer circuit having terminals to provide therebetween the desired intelligence voltage, two rectifiers having respective input sides and respective output sides, said two rectifier output sides being connected in said mixer circuit in series opposition to each other, said two sources being connected in series cumulative relation to each other across said input side of one of said rectifiers, an electromagnetic translating device having two mutually differential input circuits connected across said respective sources and having an output circuit connected across the input side of said other rectifier, and rheostat means interposed between said mixer circuit and at least one of said rectifiers.

14. A composite voltage source for providing intelligence voltage of a desired relation to the pass speed of two-reel rewinders, comprising two tachometric sources of variable voltages proportional to the respective reel revolving speeds, two voltage dividing circuit members connected across said respective sources and having respective taps positionable to divide each member into a minor and a major voltage portion, and a mixer circuit having terminals to provide therebetween the desired intelligence voltage and extending through said two taps, and polarized relay means having differentially related control circuits connected across said respective sources and being adjustable between two relay conditions dependent upon the polarity of the difference of said two variable voltages, said relay means connecting said mixer circuit through said minor portion of one of said members and said major portion of said other member in one of said relay conditions and connecting said mixer circuit through said major portion of said one member and said minor portion of said other member in said other relay condition.

15. In a composite voltage source according to claim 14, said minor portion and said major portion of each of said circuit members having a voltage ratio of 1—$k$ to 1+$k$, wherein $k$ is a constant value smaller than unity.

16. In a composite voltage source according to claim 15, a rectifier disposed in said mixer circuit, and having input terminals connected with said respective taps and output terminals connected with said respective terminals of said mixer circuit.

17. In an electric system, in combination, a source of variable voltage, a second source of variable voltage, circuit means interconnecting said sources for producing a voltage that is equal to the sum of the voltages of said sources, second circuit means interconnecting said sources for producing a voltage that is equal to the difference between the voltages of said sources, and voltage combining circuit means, including means for utilizing only a selected portion of the voltage output of the second circuit means, interconnected with the first circuit means for producing a control voltage that is a function of the difference of the voltage produced by the first circuit means and the fractional portion of the voltage output of the second circuit means to which said voltage combining circuit means is responsive.

18. In an electric system, in combination, generating means for producing a variable voltage, second generating means for producing a variable voltage, voltage combining means, electrically associated with said generating means, for producing a combined voltage that is a function of the sum of said variable voltages, second voltage combining means, also electrically associated with said generating means, for producing a second combined voltage that is a function of the difference of said variable voltages, and circuit means, interconnected with said voltage combining means, for subtracting a selected portion of the second combined voltage from the first combined voltage.

19. In an electric system, in combination, generating means for producing a variable voltage, second generating means for producing a second variable voltage, voltage combining means for said generating means to produce a combined voltage that is substantially equal to the sum of said variable voltages, second voltage combining means for said generating means to produce a second combined voltage that is substantially equal to the difference of said variable voltages, voltage transmitting circuit means connected to said second voltage combining means and adapted to produce a voltage that is a selected fractional portion of the second combined voltage, said voltage transmitting circuit means being interconnected with the first voltage combining means to act differentially to the first combined voltage, and controlled circuit means interconnected with said two voltage combining means and said voltage transmitting circuit means to be responsive to the difference between the first combined voltage and a selected fractional portion of the second combined voltage.

20. In an electric system, in combination, generating means in normal use operated to produce an output voltage that varies substantially parabolically from a given minimum value to a given maximum value during a given interval of time, second generating means in normal use operated to produce a second output voltage that varies inversely substantially parabolically from said given maximum value to said given minimum value, voltage combining means for said generating means for producing a third output voltage that is equal to the sum of the output voltages of said two generating means, second voltage combining means for said generating means for producing a fourth output voltage that is equal to the difference of the output voltages of said two generating means, and a mixing circuit for said two voltage combining means for producing a fifth voltage output that is equal to the difference between the third and fourth output voltages.

21. In an electric system, in combination, generating means in normal use operated to produce an output voltage that varies substantially parabolically from a given minimum value to a given maximum value during a given interval of time, second generating means in normal use operated to produce a second output voltage that varies inversely substantially parabolically from said given maximum value to said given minimum value, voltage combining means for said generating means for producing a third output voltage that is equal to the sum of the output voltages of said two generating means, second voltage combining means for said generating means, means coacting with said second voltage combining means for producing a fourth but selected fractional output voltage of the difference of the output voltages of said two generating means, and mixing circuit means for said two voltage combining means for producing a fifth voltage output that is equal to the difference between the third voltage output and said fourth but fractional voltage output.

22. In an electric system, in combination, generating means in normal use operated to produce an output voltage that varies substantially parabolically from a given minimum value to a given maximum value during a given interval of time, second generating means in normal use operated to produce a second output voltage that varies inversely substantially parabolically from said given maximum value to said given minimum value, voltage combining means for said generating means for producing a third output voltage that is equal to the sum of the output voltages of said two generating means, second voltage combining means, including means for selecting a selected fractional part of the output voltage of the first generating means and including means for selecting a selected fractional part of the output voltage of the second generating means, for producing a fourth voltage output, and mixing circuit means for producing a fifth voltage output that is substantially equal to the difference between the third and fourth output voltages.

23. In an electric system, in combination, generating means in normal use operated to produce an output voltage that varies substantially parabolically from a given minimum value to a given maximum value during a given interval of time, second generating means in normal use operated to produce a second output voltage that varies inversely substantially parabolically from said given maximum value to said given minimum value, voltage combining means for said generating means for producing a third output voltage that is equal to the sum of the output voltages of said two generating means, second voltage combining means, including means for selecting a selected fractional part of the output voltage of the first generating means and including means for selecting a selected fractional part of the output voltage of the second generating means, for producing a fourth voltage output, mixing circuit means for the second voltage combining means for producing a fifth voltage output that is a selected fractional part of the fourth voltage output, and second mixing circuit means for the first voltage combining means and first mixing circuit means for producing a sixth voltage output that is a function of the difference between the third voltage output and fifth voltage output.

24. In an electric system, in combination, generating means in normal use operated to produce an output voltage that varies substantially parabolically from a given minimum value to a given maximum value during a given interval of time, second generating means in normal use operated to produce a second output voltage that varies inversely substantially parabolically from said given maximum value to said given minimum value, voltage combining means for said generating means for producing a third output voltage that is equal to the sum of the output voltages of said two generating means, second voltage combining means, including means for selecting a selected fractional part of the output voltage of the first generating means and including means for selecting a selected fractional part of the output voltage of the second generating means, for producing a fourth voltage output, mixing circuit means for the second voltage combining means for producing a fifth voltage output that is a selected fractional part of the fourth voltage output, and second mixing circuit means for the first voltage combining means and first mixing circuit means for producing a sixth voltage output that is a function of the difference between the third voltage output and fifth voltage output, and speed regulating means for regulating the speed of an electric motor as a function of said sixth voltage output.

25. In an electric system, in combination, generating means for producing a variable voltage, second generating means for producing a variable voltage, voltage combining means, electrically associated with said generating means, for producing a combined voltage that is a function of the sum of said variable voltages, second voltage combining means, also electrically associated with said generating means, for producing a second combined voltage that is a function of the difference of said variable voltages, mixing circuit means, interconnected with said voltage combining means, for abstracting a selected fraction of the second combined voltage from the first combined voltage to thus produce a control voltage, and electrical apparatus interconnected with said mixing circuit means for operating in accordance with said control voltage.

26. In an electric system, in combination, a source of variable voltage, a second source of variable voltage, circuit means interconnecting said sources for producing a voltage that is equal to the sum of the voltages of said sources, second circuit means interconnecting said sources for producing a voltage that is equal to the difference between the voltages of said sources, and voltage combining means, responsive to a selected portion of the voltage output of the second circuit means, interconnected with the first circuit means for producing a control voltage that is a function of the difference of the voltage produced by the first circuit means and the fractional portion of the voltage output of the second circuit means to which said voltage combining means is responsive, and electrical apparatus interconnected with said voltage combining means to thus operate in response to said control voltage.

References Cited in the file of this patent

UNITED STATES PATENTS

| | | |
|---|---|---|
| 1,886,749 | Seeley | Nov. 8, 1932 |
| 2,043,208 | Bohn | June 2, 1936 |
| 2,060,672 | Heymann | Nov. 10, 1936 |
| 2,168,777 | McCreary | Aug. 8, 1939 |
| 2,175,729 | Howe | Oct. 10, 1939 |
| 2,237,985 | Garman | Apr. 8, 1941 |
| 2,437,973 | Schmitz | Mar. 16, 1948 |
| 2,447,208 | Hendel | Aug. 17, 1948 |

OTHER REFERENCES

"Electronic Computers," Shannon, "Electronics," Aug. 1946, pages 110–113.

"Electronics Instruments," Greenwood, Holdam and McRae, McGraw-Hill Book Co., chapter III.